United States Patent
Crowell

(10) Patent No.: US 9,530,582 B2
(45) Date of Patent: Dec. 27, 2016

(54) ENERGIZED PARTS GUARD

(71) Applicant: Jones Lang LaSalle IP, Inc., Chicago, IL (US)

(72) Inventor: David V. Crowell, Roseville, CA (US)

(73) Assignee: JONES LANG LASALLE IP, INC., Chicago, IL (US)

( * ) Notice: Subject to any disclaimer, the term of this patent is extended or adjusted under 35 U.S.C. 154(b) by 0 days.

(21) Appl. No.: 14/567,832

(22) Filed: Dec. 11, 2014

(65) Prior Publication Data

US 2016/0172128 A1 Jun. 16, 2016

(51) Int. Cl.
*H05K 5/00* (2006.01)
*H01H 9/02* (2006.01)

(52) U.S. Cl.
CPC ...... *H01H 9/0264* (2013.01); *H01H 2223/044* (2013.01)

(58) Field of Classification Search
USPC ................. 174/50, 67; 220/3.7, 3.8
See application file for complete search history.

(56) References Cited

U.S. PATENT DOCUMENTS

| | | | |
|---|---|---|---|
| 3,375,411 A | 3/1968 | Mrowka | |
| 3,618,804 A * | 11/1971 | Krause | H02B 1/40 174/50 |
| 3,656,083 A | 4/1972 | Brook | |
| 5,072,071 A * | 12/1991 | Cassity | H02B 1/056 174/135 |
| 5,894,404 A | 4/1999 | Vrnak et al. | |
| 6,245,998 B1 | 6/2001 | Curry et al. | |
| 7,116,550 B2 | 10/2006 | Ewing et al. | |
| 7,405,923 B2 | 7/2008 | Kelly et al. | |
| 7,440,262 B2 | 10/2008 | Coffey et al. | |
| 8,305,739 B2 * | 11/2012 | Dozier | H02B 1/056 174/50 |
| 8,570,714 B2 * | 10/2013 | Weighell | H02B 1/056 174/50 |
| 2006/0176623 A1 | 8/2006 | Stillwagon et al. | |
| 2008/0193692 A1 | 8/2008 | Wellington | |
| 2012/0067610 A1 | 3/2012 | Stonebraker et al. | |
| 2012/0186847 A1 | 7/2012 | Martin | |
| 2014/0118101 A1 | 5/2014 | Navarro | |
| 2014/0151113 A1 | 6/2014 | Makino et al. | |

OTHER PUBLICATIONS

International Search Report, dated Feb. 10, 2016, issued in corresponding International Application No. PCT/US2015/064882.
Written Opinion, dated Feb. 10, 2016, issued in corresponding International Application No. PCT/US2015/064882.

* cited by examiner

*Primary Examiner* — Dhirubhai R Patel
(74) *Attorney, Agent, or Firm* — Troutman Sanders LLP

(57) ABSTRACT

An energized parts guard is disclosed includes a panel of substantially rigid, electrically insulative material wherein the substantially rigid panel further includes a first one or more apertures and a second one or more apertures. The first one or more apertures are so dimensioned to accept one or more circuit breakers inserted into the first one or more apertures such that there is less than a 12.5 millimeter gap between the panel and the circuit breaker on at least two sides of the one or more circuit breakers. The second one or more apertures are positioned to facilitate access to at least one terminal of each of the one or more circuit breakers when the one or more circuit breakers are inserted into the first one or more apertures.

20 Claims, 10 Drawing Sheets

ENERGIZED PARTS GUARD

FIELD

This disclosure relates to safety devices for electrical maintenance. More specifically, this disclosure relates to a device to prevent contact with exposed energized electrical conductors during electrical maintenance.

BACKGROUND

Electrical Panel Construction

Electrical panels are used to distribute electrical energy within buildings. Depending on the voltage, purpose, and configuration, electrical panels may be described as "load centers," "panelboards," "distribution boards," "switchboards," "switchgear," or by other terms used in the industry and known to those skilled in the art. For the purposes of this disclosure, an electrical panel includes a metallic enclosure, one or more incoming power circuits (feeders or electrical power sources), one or more outgoing power circuits (serving electrical loads), and one or more circuit-switching devices which control the flow of electricity among the circuits.

Inside the metallic enclosure of the electrical panel, the incoming circuits may be connected to the circuit breakers directly or via an electrical bus. Connection of the incoming circuit via an electrical bus is the most common configuration and will be assumed, without limitation, throughout the remainder of this application. Most applications will include two or three energized ("hot" or "live") buses of different polarities and one or two neutral buses. The energized buses are normally of two or three different phases. Neutral buses are normally bonded to ground potential at the building's electrical service entrance and allowed to electrically "float" above ground potential throughout the rest of the building. In demanding applications, for example above 1000 volts, the electrical panel may also include a separate ground bus.

The circuit-switching devices are most commonly circuit breakers. Therefore reference to "circuit breakers" throughout this application includes, without limitation, other circuit-switching devices, including switches, fuses, and switch-fuse combinations. The circuit breakers have controls which are electrically insulated from the incoming and outgoing power circuits. Each load circuit is connected to the bus through a circuit breaker. The circuit breakers allow the load circuits to be manually de-energized using the insulated control of the circuit breaker. The circuit breaker also automatically de-energizes the circuit in response to an overload or short circuit. Depending on the application, a main circuit breaker (not shown) may be provided to isolate the buses from the incoming circuits. A main circuit breaker will often be required by code when the number of load circuits exceeds a certain number.

FIG. 1 illustrates the circuit diagram of an exemplary electrical panel. In this example, the electrical panel has two incoming circuits 100 (two-phase) and twelve outgoing circuits 102. Each outgoing circuit 102 is connected to a circuit breaker 104. Each circuit breaker 104 is connected in turn to an energized bus 106. In this example, the neutral bus 108 is bonded 110 to ground. The energized buses 106, neutral bus 108, and circuit breakers 104 are all contained within a grounded metallic enclosure 114. FIG. 2 illustrates the circuit diagram for a similar exemplary electrical panel, in this case having three incoming circuits (three-phase).

FIG. 3 illustrates the exterior of an electrical panel 300. The metallic enclosure 114 is electrically grounded. The metallic enclosure 114 normally includes a lockable door 302 and a removable front panel 304. When locked, the door 302 prevents unauthorized access to the insulated controls 306 of the circuit breakers 104. When locked, cover also prevents removal of the front panel 304. The front panel 304 is held in place by threaded fasteners 310.

The insulated controls 306 of the circuit breakers 104 extend through at least one wall of the metallic enclosure 114, normally the front panel 304. This allows a user to operate the circuit breaker(s) without exposure to any energized parts within the metallic enclosure 114. Common types of insulated controls 306 include switches, levers, and push-buttons, although other types of controls may be used. In some configurations the removable front panel 304 may have permanently removable sections 308 to accommodate adding circuit breakers 104 to the electrical panel 300. These removable sections 308 are called "knockouts" because they are removed by breaking a weld or a perforation in the metallic panel, usually with a hammer, screwdriver, and pliers. If a knockout 308 is removed and no corresponding circuit breaker is added to the electrical panel, the energized bus will be exposed in the empty breaker position. Special inserts, called "blanks," are available which snap into the front panel and prevent the energized bus from being exposed.

The International Electrotechnical Commission (IEC) publishes standards for controlling access to electrical equipment. These Ingress Protection (IP) standards consist of a two-digit number. The first digit defines the protection against the ingress of solid objects. The second digit defines the protection against the ingress of liquids. For example, an IP31 enclosure provides protection against the ingress of solid objects 2.5 mm in diameter and against water dripping from above. In the United States, the National Electrical Manufacturer's Association (NEMA) produces a similar standard for ingress protection. The IP ratings are summarized in the table below:

TABLE 1

| Solid Object Protection | | | Liquid Protection | |
| --- | --- | --- | --- | --- |
| Level | Object size protected against | Effective against | Level | Object size protected against |
| 0 | Not protected | No protection against contact and ingress of objects | 0 | Not protected |
| 1 | >50 mm | Any large surface of the body, such as the back of the hand, but no protection against deliberate contact with a body part. | 1 | Dripping water |

TABLE 1-continued

| | Solid Object Protection | | | Liquid Protection |
|---|---|---|---|---|
| Level | Object size protected against | Effective against | Level | Object size protected against |
| 2 | >12.5 mm | Fingers or similar objects. | 2 | Dripping water when tilted up to 15° |
| 3 | >2.5 mm | Tools, thick wires, etc. | 3 | Spraying water |
| 4 | >1 mm | Most wires, screws, etc. | 4 | Splashing water |
| 5 | Dust Protected | Ingress of dust is not entirely prevented, but it must not enter in sufficient quantity to interfere with the satisfactory operation of the equipment; complete protection against contact. | 5 | Water jets |
| 6 | Dust Tight | No ingress of dust; complete protection against contact. | 6 | Powerful water jets |
| | | | 7 | Immersion up to 1 m |
| | | | 8 | Immersion beyond 1 m |

Industry Work Practices

When working on the circuits in the electrical panel 300, the front panel 304 of the metallic enclosure 114 must be removed to expose the clamped and/or bolted connections of each circuit to the bus or circuit breakers. This work may include, but is not limited to: testing whether a circuit is energized, troubleshooting a circuit, adding a circuit, removing a circuit, upgrading a circuit, moving a circuit to a different circuit breaker, replacing a faulty circuit breaker, and upgrading a circuit breaker. In short, any work involving testing, moving a circuit breaker 104, or moving a wire will likely require removing the front panel 304 of the metallic enclosure 114.

If any of the incoming circuits are energized, removing the front panel will expose the worker to energized parts. Exposure to energized parts creates a hazard of electrocution and a hazard of an arc flash. An arc flash occurs when electricity "jumps" through the air from an energized conductor to a grounded conductor or a conductor of a different polarity. Air is normally an insulator, so the electricity must ionize the air, releasing light and heat. In some cases, the energy released is enough to create an explosive pressure wave and eject electrical components and molten metal. While the risk of electrocution is based primarily on the nominal system voltage, the hazard from an arc flash is based on both the system voltage and the short-circuit current. Unlike voltage, available short-circuit current must be determined on a panel-by-panel basis by an engineering study, making it much more difficult to classify the arc-flash hazard.

In the past, work safety practices focused only on reducing the risk of electrocution. Workers could work on energized parts if they used appropriate Personal Protective Equipment (PPE). For example, work on energized parts required special electrically insulated tools and/or specially-rated electrically insulated gloves. Rules may also have required hard hats or boots specially rated for their electrically insulating properties.

Another work safety practice is called "lockout/tagout." This practice is intended to prevent accidents from working on an energized circuit in the mistaken belief that the circuit is de-energized. When a circuit breaker is opened, de-energizing the circuit, lockout/tagout requires attaching a lock and/or tag to the insulated control of the circuit breaker. The lock and/or tag prevents accidentally closing the circuit breaker and energizing the circuit, which could endanger an unsuspecting person working elsewhere on that circuit. In many circumstances additional devices may be temporarily fitted to the insulated control of the circuit breaker to accommodate the lock or tag.

As industry awareness of the arc-flash hazard grew, the Occupational Health and Safety Administration (OSHA), a federal agency governing workplace safety, created new rules to reduce the risk of arc-flash injuries. The new rules required that "ive parts to which an employee may be exposed shall be de-energized before the employee works on or near them, unless the employer can demonstrate that de-energizing introduces additional or increased hazards or is infeasible due to equipment design or operational limitations." 29 CFR 1910.333(a)(1). The old practice of working on or near exposed energized circuits, even with appropriate PPE, is thus prohibited unless the employer proves that de-energizing all of the circuits increases hazards or is "infeasible".

Energized work is allowed to avoid introducing "additional or increased hazards" only when life-safety equipment is de-energized. For example, circuits supplying fire alarms, sprinkler pumps, and life-support equipment may be worked-on while energized. This limitation is strictly enforced.

Testing and troubleshooting de-energized circuits is considered "infeasible" because electrical power is needed to check an electrical circuit's function. Therefore, testing of energized circuits is allowed, but no other work may be done on or near them. The use of "tools" (i.e. metallic tools which are likely to cause a flash-over, even if they insulate the user from electrocution) is specifically prohibited.

SUMMARY

An energized parts guard is disclosed to permit working in the vicinity of energized circuits without exposing an operator to the exposed energized components. The energized parts guard is insulative. When properly used, the energized parts guard prevents contact with any exposed energized parts within an electrical panel but allows access to de-energized components to work on them An energized parts guard is disclosed comprising a panel of substantially rigid, electrically insulative material wherein the substantially rigid panel further comprises a first one or more apertures and a second one or more apertures. The first one or more apertures are so dimensioned to accept one or more circuit breakers inserted into the first one or more apertures such that there is less than a 12.5 mm gap between the panel and the circuit breaker on at least two sides of the one or more circuit breakers. The second one or more apertures are positioned to facilitate access to at least one terminal of each of the one or more circuit breakers when the one or more circuit breakers are inserted into the first one or more apertures.

In another embodiment, the energized parts guard includes a third one or more apertures configured to facilitate mounting the energized parts guard to an electrical panel when the one or more circuit breakers are inserted into the first one or more apertures.

In another embodiment, the first one or more apertures of the energized parts guard are further configured such that there is less than 12.5 mm gap between the panel and the one or more circuit breakers on at least three sides of the one or more circuit breakers. In another embodiment, the first one or more apertures of the energized parts guard are further configured such that there is less than 12.5 mm gap between the panel and the one or more circuit breakers on four sides of the one or more circuit breakers.

In another embodiment, there is less than a 2.5 mm gap between the panel and the one or more circuit breakers on at least two sides of the one or more circuit breakers. In another embodiment there is less than a 2.5 mm gap between the panel and the one or more circuit breakers on at least three sides of the one or more circuit breakers. In another embodiment there is less than a 2.5 mm gap between the panel and the one or more circuit breakers on at least four sides of the one or more circuit breakers.

In another embodiment there is less than a 1 mm gap between the panel and the one or more circuit breakers on at least two sides of the one or more circuit breakers. In another embodiment there is less than a 1 mm gap between the panel and the one or more circuit breakers on at least three sides of the one or more circuit breakers. In another embodiment there is less than a 1 mm gap between the panel and the one or more circuit breakers on at least four sides of the one or more circuit breakers.

In another embodiment the panel of substantially rigid, electrically insulative material extends at least 50 mm beyond any exposed edge of any of the one or more circuit breakers inserted into the first one or more apertures. In another embodiment the panel of substantially rigid, electrically insulative material extends at least 50 mm from any terminal of the one or more circuit breakers inserted into the first one or more apertures. In another embodiment all of the edges of the panel of substantially rigid, electrically insulative material are each at least 50 mm from any exposed conductor of the electrical panel or the one or more circuit breakers inserted into the first one or more apertures. In another embodiment all of the edges of the panel of substantially rigid, electrically insulative material are no greater than 50 mm from the metallic enclosure of the electrical panel.

In another embodiment, the edges of the panel of substantially rigid, electrically insulative material are configured to prevent contact with any terminals of any circuit breakers inserted into the first one or more apertures, any electrical bus connected to any circuit breakers inserted into the first one or more apertures, and any exposed electrical conductors connected to the circuit breakers inserted into the first one or more apertures or the electrical bus connected to any circuit breakers inserted into the first one or more apertures.

In another embodiment, the energized parts guard also includes electrically insulating covers for the second one or more apertures. In another embodiment the insulating covers are tethered to the energized parts guard. In another embodiment the electrically insulating covers are tethered to one another. In another embodiment the tethers between the electrically insulating covers of the plurality of electrically insulating covers are contiguous with the electrically insulating covers they tether.

In another embodiment the insulating covers interlock with the one or more circuit breakers, preventing access to the circuit-breaker terminals unless the circuit breakers are in the open position.

In another embodiment the energized parts guard is so dimensioned to permit attaching a lock or tag to an insulated control of at least one of the one or more circuit breakers when the one or more circuit breakers are inserted into the first one or more apertures.

DETAILED DESCRIPTION

An energized parts guard is disclosed to permit working in the vicinity of energized circuits without exposing an operator to the exposed energized components. The energized parts guard is insulative. When properly used, the energized parts guard prevents contact with any exposed energized parts within an electrical panel but allows access to de-energized components to work on them.

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Figure 1:
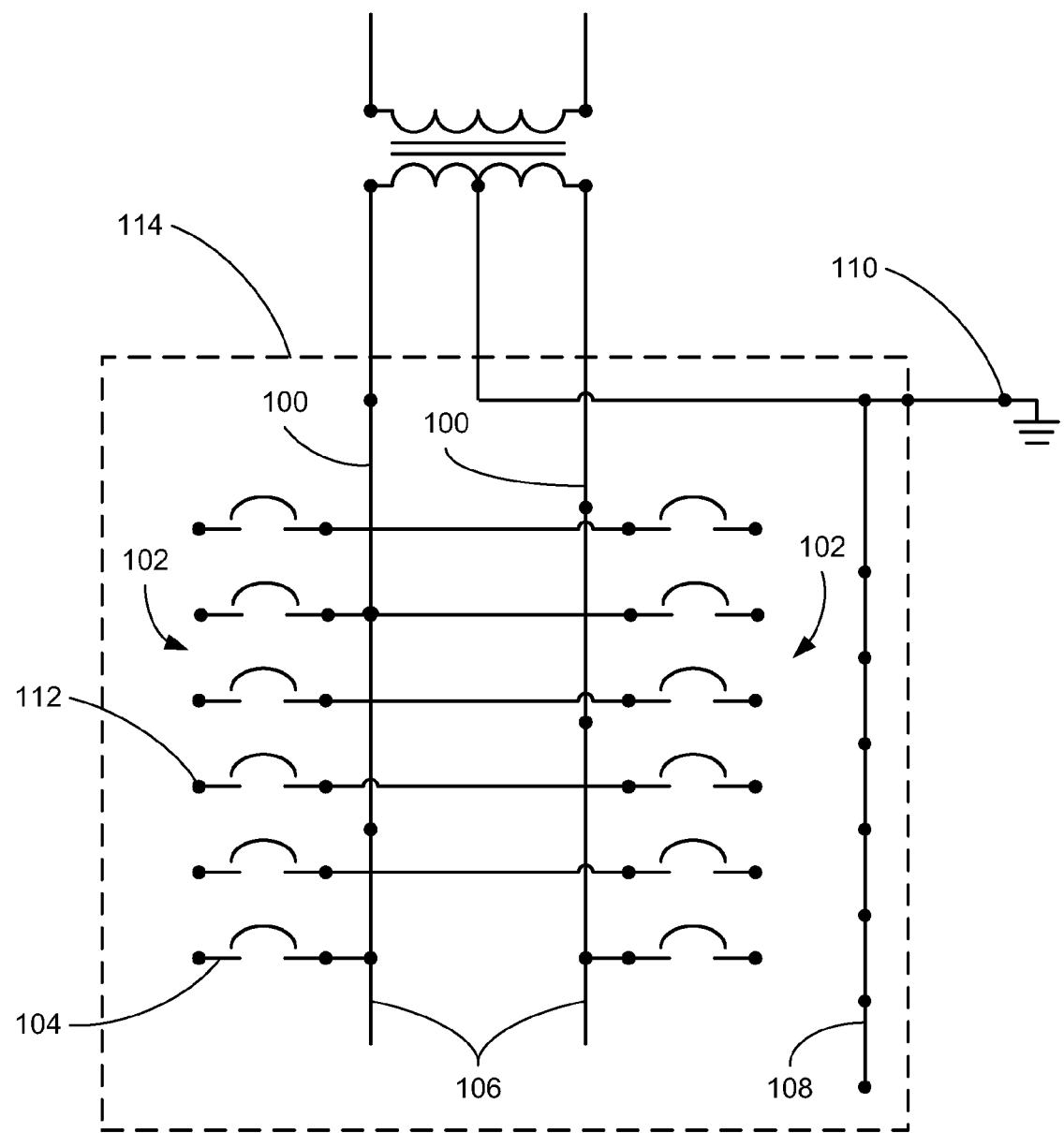
FIG. 1 is a circuit diagram of a two-phase electrical panel illustrating the incoming circuits, outgoing circuits, buses, and circuit breakers, in accordance with the present disclosure.
Figure 2:
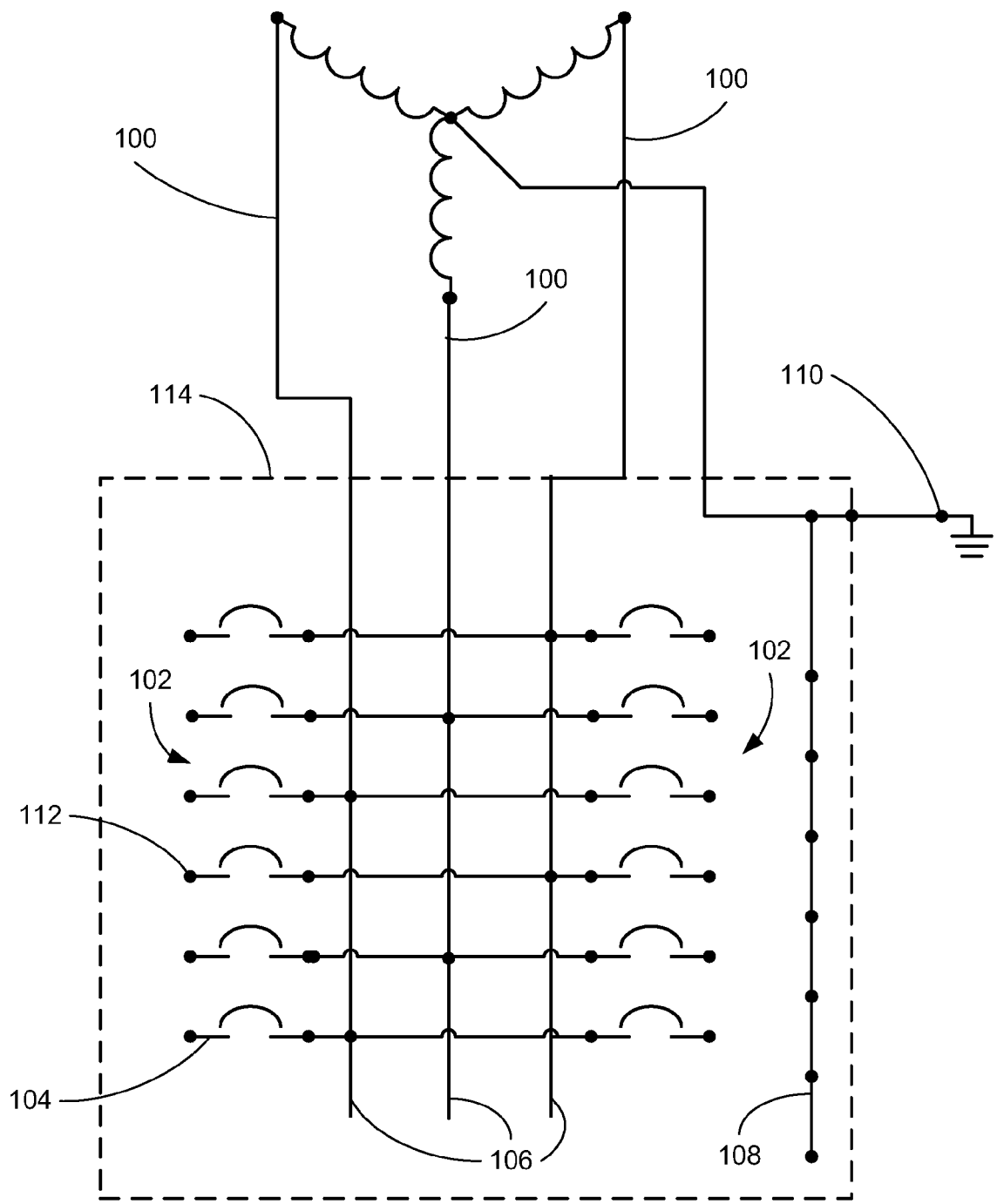
FIG. 2 is a circuit diagram of a three-phase electrical panel illustrating the incoming circuits, outgoing circuits, buses, and circuit breakers, in accordance with the present disclosure.
Figure 3:
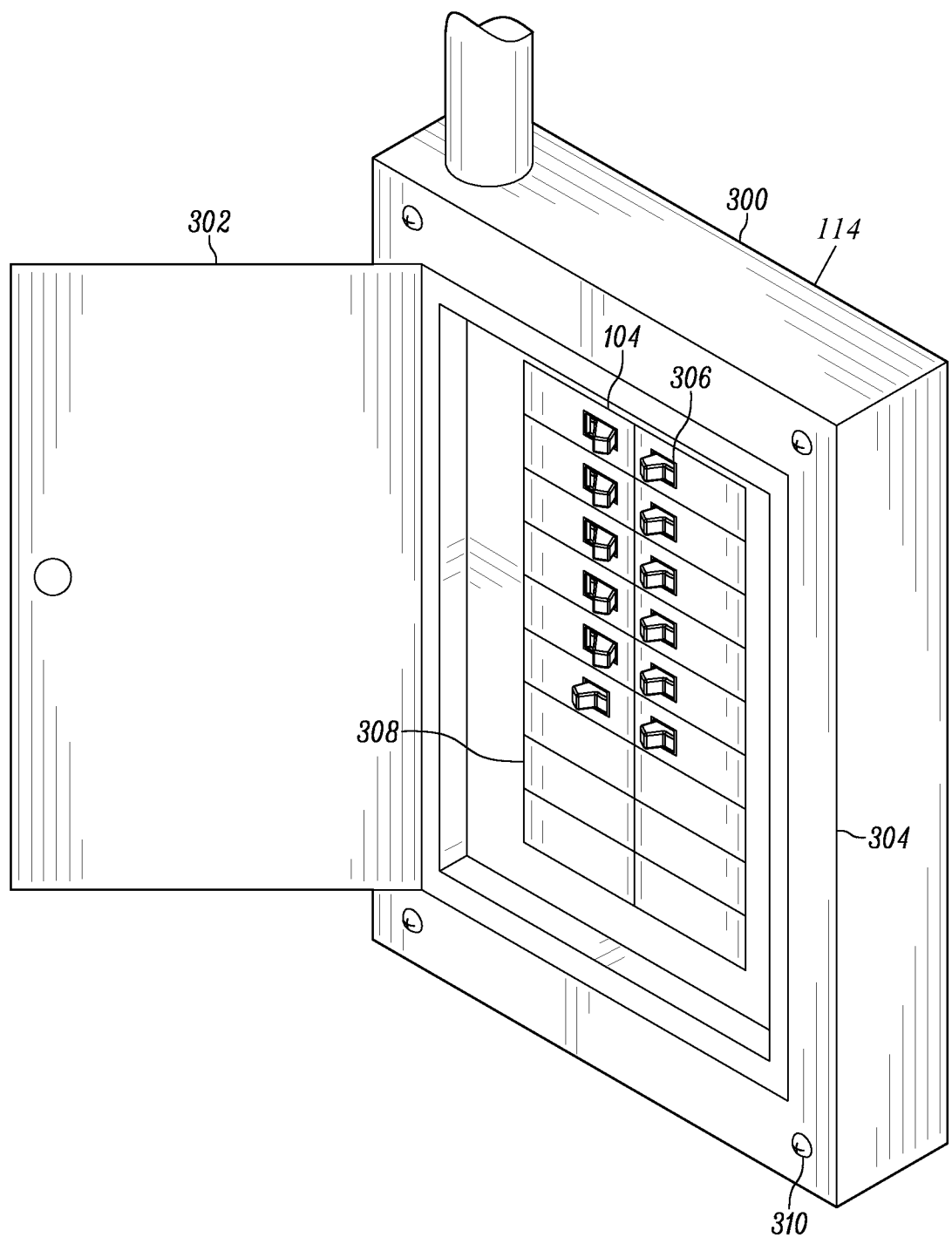
FIG. 3 is an isometric drawing of the exterior of an electrical panel illustrating the metallic enclosure, the lockable front door, and the removable front panel in accordance with the present disclosure.
Figure 4:
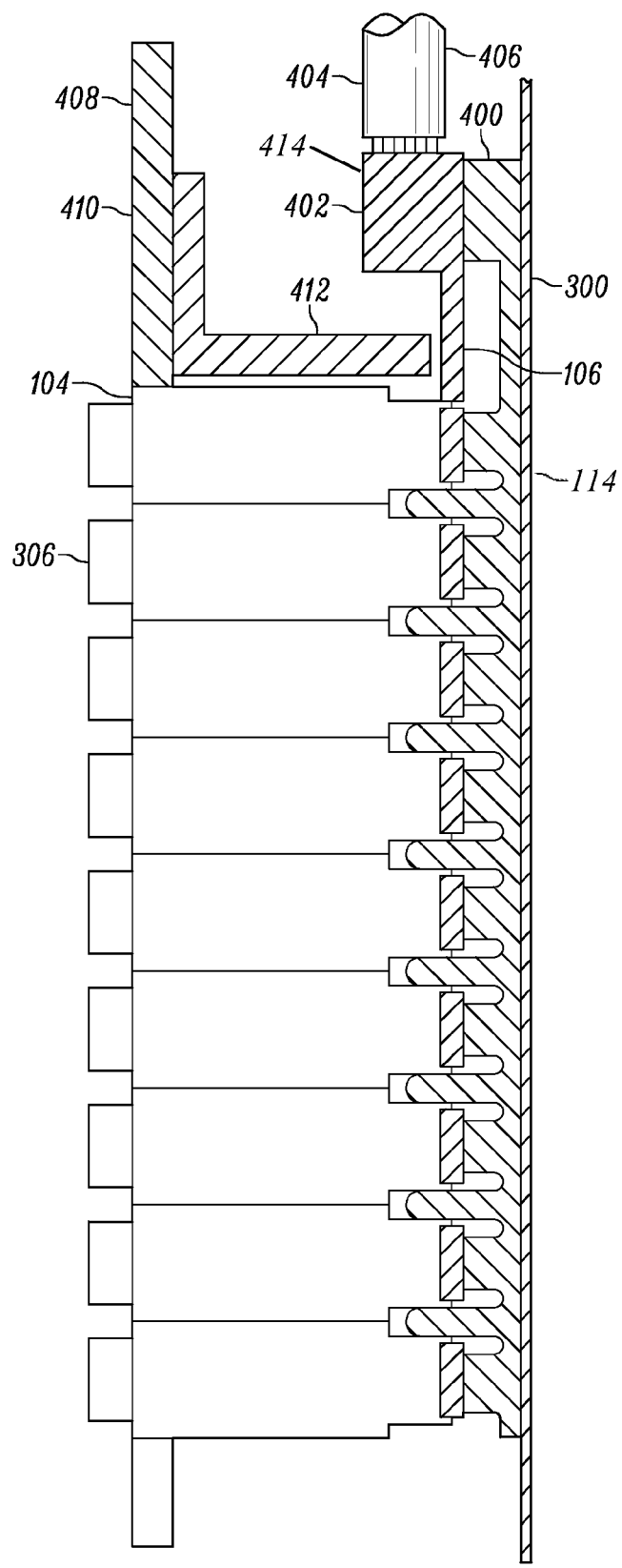
FIG. 4 is a cross-section of an electrical panel with the energized parts guard installed, illustrating the enclosure, the bus, an incoming circuit, the circuit breakers, and the energized parts guard in accordance with the present disclosure.

Referring now to FIG. 4, which illustrates a cross section of an exemplary electrical panel 300 with an energized parts guard installed, the energized electrical bus 106 is supported on insulators or an insulative component 400 (such as a molded plastic bracket) to insulate them from the grounded enclosure 114. The incoming circuit conductors are typically connected 402 to the bus 106 by clamping with a threaded fastener. The method of clamping depends on the design of the panel and the rated voltage and current of the electrical panel. For most applications the wires 404 of the incoming circuits 100 will be stripped of insulation 406 and the bare conductors will be inserted into a clamp 414 which is tightened by turning a screw. For higher voltages and/or current, a separate terminal may be crimped onto the bare conductor and then bolted to the bus.

The load circuits are generally connected to the circuit breaker 104 terminals 112 by clamping with a threaded fastener. In most applications, the wires of the outgoing circuits 102 will be stripped of insulation and the bare conductors will be inserted into a clamp which is tightened by turning a screw. For load circuits, the clamp is normally integral to the circuit breaker 104. For higher voltages and/or current, a terminal may be crimped onto the bare conductor and then bolted to the circuit breaker 104 or, in the case of "rack-out" breakers, a bus extension.

In many configurations the circuit breakers 104 snap into place. In these configurations, the circuit breakers 104 are held in place by mating features on the bus 106 and/or the insulator(s) 400 supporting the bus 106. Circuit breakers for higher voltage and current may be bolted into place or they may be inserted or removed via a mechanism, a process referred to as "racking in/racking out."

The energized parts guard 408 is made primarily of electrically insulating materials, such as polymers, ceramics, or wood. The energized parts guard 408 is preferably made from a substantially-rigid, electrically-insulating polymer. The energized parts guard 408 is more preferably made from an impact-resistant, substantially-rigid, electrically-insulating polymer. The energized parts guard 408 is most preferably made from a transparent, impact-resistant, substantially-rigid, electrically-insulating polymer. In one embodiment, the energized parts guard 408 may be made from polycarbonate (PC). In another embodiment, the parts guard may be made from a material including two or more laminations of polycarbonate. In another embodiment, the energized parts guard 408 may be made from poly(methyl methacrylate) (PMMA). In another embodiment, the material of the energized parts guard 408 may be treated or formulated to resist degradation from ultraviolet light. In another embodiment, the material of the energized parts guard 408 may be treated or formulated to resist electrical tracking Electrical tracking is the degradation of a polymeric insulating material over time by partial discharges of electricity resulting in deposition of a conductive carbon "track" on the insulating surface.

The energized parts guard 408 includes a panel 410 with a plurality of apertures (i.e. holes or openings) and one or more covers for the apertures. The panel 410 is a sheet of insulating material having sufficient height and width to prevent direct exposure to any conductors exposed by removing the front panel 304 of an electrical panel 300. Any incidental contact with an exposed energized conductor is thus avoided. In the preferred embodiment, the height and width will match the front panel 304 removed from the electrical panel 300.

The panel 410 of the energized parts guard 408 is sufficiently stiff to prevent excessive flexing from incidental contact. Excessive flexing in this case would permanently deform the panel or allow contact with exposed energized conductors. In one embodiment, sufficient stiffness may be achieved by a flat panel of sufficient thickness. In another embodiment, sufficient stiffness may be achieved by ribs, walls, or pockets which are molded into, embossed into, fastened to, or otherwise incorporated into the panel.

Figure 5:
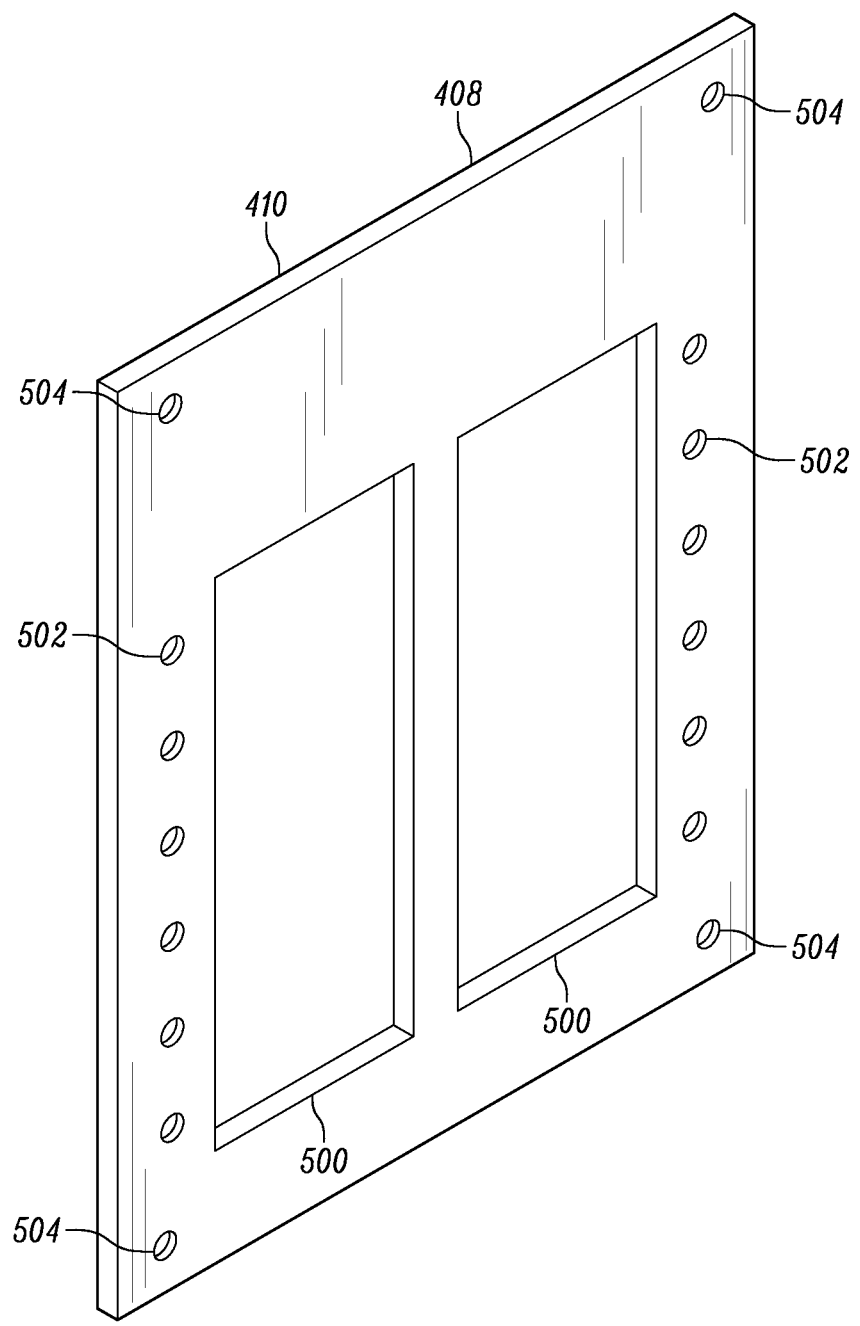
FIG. 5 is an isometric drawing of the energized parts guard illustrating its basic features in accordance with the present disclosure.

Referring now to FIG. 5, which illustrates the basic features of the energized parts guard, the energized parts guard 408 includes one or more circuit-breaker apertures 500, which fit over the insulated controls 306 of the circuit breakers 104 when the energized parts guard 408 is installed on an electrical panel 300. The circuit-breaker apertures 500 are so dimensioned that when properly installed, the circuit-breaker apertures 500 allow the insulated controls 306 to protrude through the energized parts guard 408 while preventing inadvertent contact with the energized conductors which were exposed by removing the front panel 304 of the electrical panel 300. The exact shape of the circuit-breaker apertures 500 depends on the exact configuration of the electrical panel 300, which is dependent on the electrical panel's manufacturer and model, among other factors. In the preferred embodiment, the circuit-breaker apertures 500 have the same dimensions as the maximum corresponding openings (i.e. with any knockouts 308 removed) as the front panel 304 of the electrical panel 300.

The energized parts guard 408 also includes a one or more terminal apertures 502. When the energized parts guard 408 is installed on an electrical panel 300 the terminal apertures 502 are aligned with terminals 112 of the circuit breakers 104. This allows access, through the terminal apertures 502, to the circuit breaker terminals 112 with a tool. In one embodiment, this allows accessing the circuit-breaker terminals 112 with a screwdriver to clamp or unclamp a circuit conductor.

In some embodiments the energized parts guard 408 may include a one or more mounting apertures 504. The mounting apertures 504 are preferably positioned and dimensioned to match the mounting arrangement of the front panel 304 of the metallic enclosure 114. For example, if the front panel 304 of the metallic enclosure 114 is mounted to 4 posts within the enclosure 114 using 4 screws, the mounting apertures 504 of the energized parts guard 408 would be four holes matching the mounting holes found in the front panel 304 of the enclosure 114.

Figure 6:
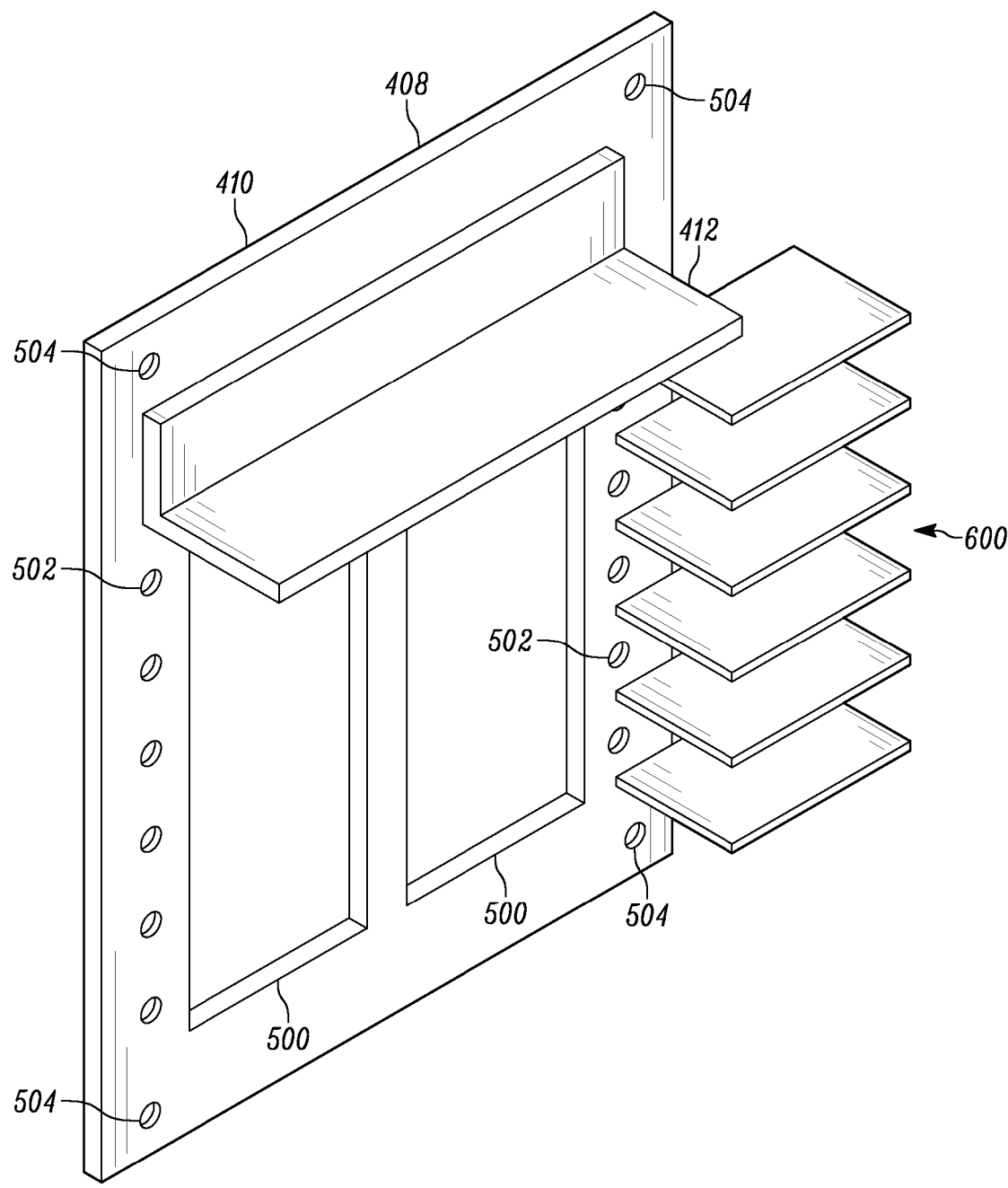
FIG. 6 is an isometric drawing of the energized parts guard with the addition of an intervening barriers illustrating the features of both in accordance with the present disclosure.

FIG. 6 illustrates another embodiment, in which the energized parts guard 408 may include additional insulating partitions. In a first embodiment, the additional partitions 412 are dimensioned so that any loose or disconnected outgoing circuit conductors cannot inadvertently touch an exposed incoming circuit conductor. In a second embodiment, additional partitions 600 are dimensioned so that loose or disconnected circuit conductors cannot inadvertently touch adjacent conductors or conductive materials (e.g. adjacent outgoing circuits, the enclosure, etc.). For example, the additional partitions in the second embodiment may separate individual incoming circuits from each other or they may separate individual outgoing circuits from each other. The first and second embodiments may be used simultaneously or independently. In further embodiments, additional partitions may be added when other known factors or situation-specific hazards warrant additional electrical or physical guarding.

Figure 7:
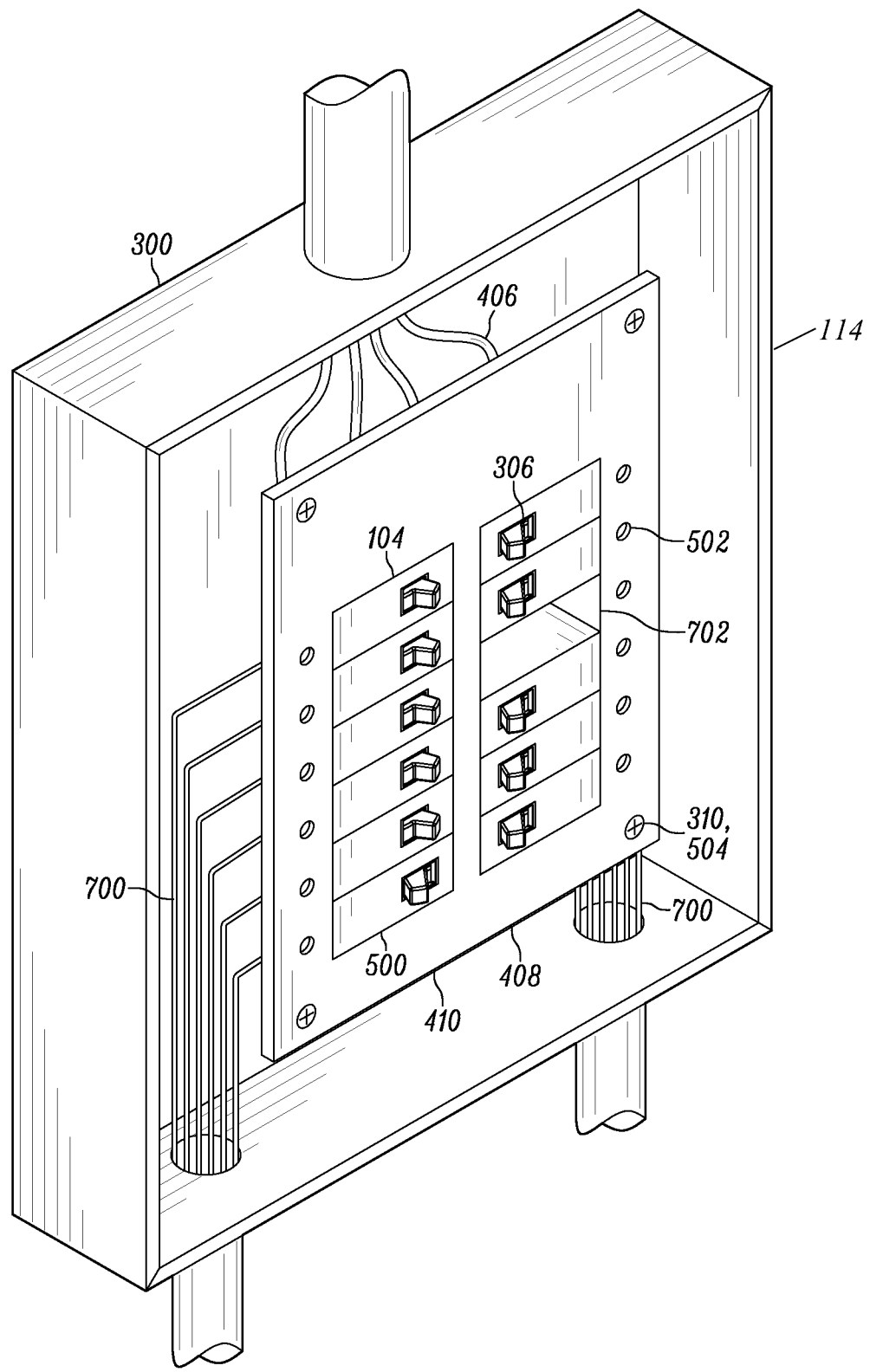
FIG. 7 is an isometric drawing of the energized parts guard installed in an electrical panel, without the covers on the terminal apertures, illustrating the relationship between the energized parts guard and the enclosure and circuit breakers of the electrical panel in accordance with the present disclosure.

FIG. 7 illustrates the energized parts guard 408 installed on an electrical panel 300. In some cases one or more circuit breaker positions may be empty 702. In some embodiments, the energized parts guard 408 is dimensioned so that a lock or tag or lockout/tagout device can be attached to the insulated controls 306 of the one or more circuit breakers 104.

Figure 8:
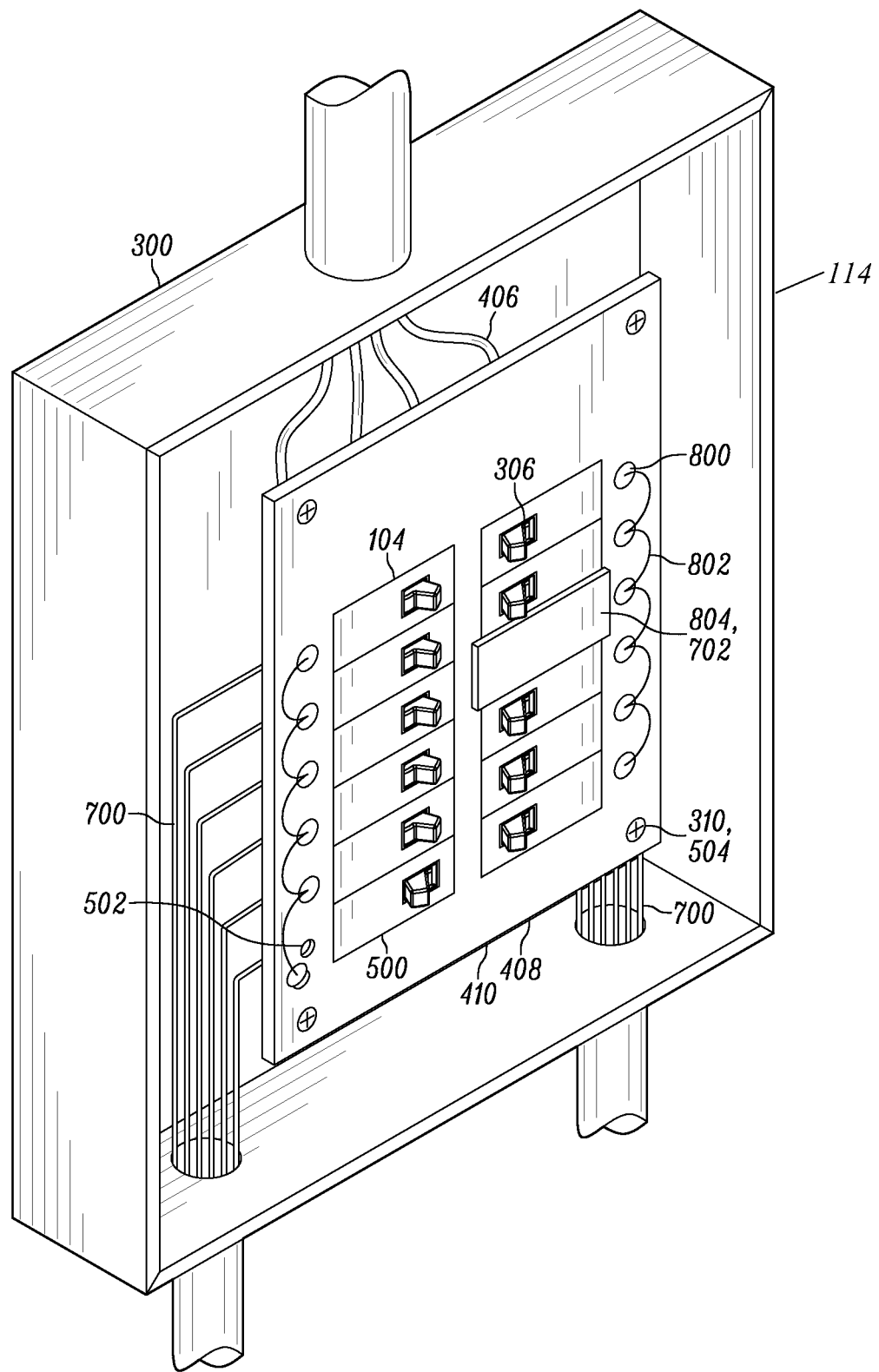
FIG. 8 is an isometric drawing of the energized parts guard installed in an electrical panel, with the covers on the terminal apertures and a circuit-breaker blank covering an open circuit-breaker position, illustrating the relationship between the energized parts guard and the enclosure and circuit breakers of the electrical panel in accordance with the present disclosure.

The energized parts guard 408 may include insulated terminal covers for the terminal apertures 502. FIG. 8 illustrates the energized parts guard 408 installed on an electrical panel 300 with the insulated terminal covers 800 and a circuit-breaker blank 804 covering an open circuit-breaker position 702. The insulated terminal covers 800 are configured to completely cover each terminal aperture and to stay in place without assistance. When properly installed, the insulated terminal covers 800 prevent access to exposed energized parts. The insulated terminal covers 800 may be held in place by friction or by additional features on the energized parts guard 408. For example, in one embodiment the insulated terminal covers 800 may be so dimensioned that they snap into terminal apertures 502. In this embodiment, the insulated terminal covers 800 may resemble grommets made of flexible plastic or an elastomer. In this embodiment, the insulated terminal covers 800 may also be tethered 802 to the energized parts guard 408 and/or to each other, to prevent losing them. In another embodiment, the insulated terminal covers 800 and the tethers 802 may be fashioned as a single contiguous piece. For example, the insulated terminal covers 800 and the tethers 802 may be molded as a single polymer component.

The preferred embodiment, which matches the opening of the removed front panel 304, also permits using the same circuit-breaker blanks 804 with the energized parts guard 408 as used with the removable front panel 304. Snapping the blank 804 into the energized parts guard 408 over the empty circuit breaker position 700 prevents access to the energized bus 106.

In another embodiment, the insulated terminal covers 800 may be made of rigid plastic and be configured as doors attached to the energized parts guard 408. In this embodiment, the door insulated terminal covers 900 may slide back and forth or may swing on a hinge.

Figure 9A:
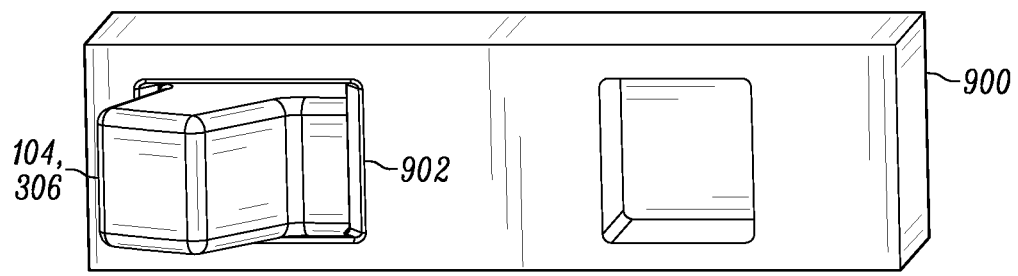
FIG. 9A an isometric drawing of one embodiment the energized parts guard illustrating a sliding door cover obstructing the terminal aperture and interlocking with the closed circuit breaker in accordance with the present disclosure.
Figure 9B:
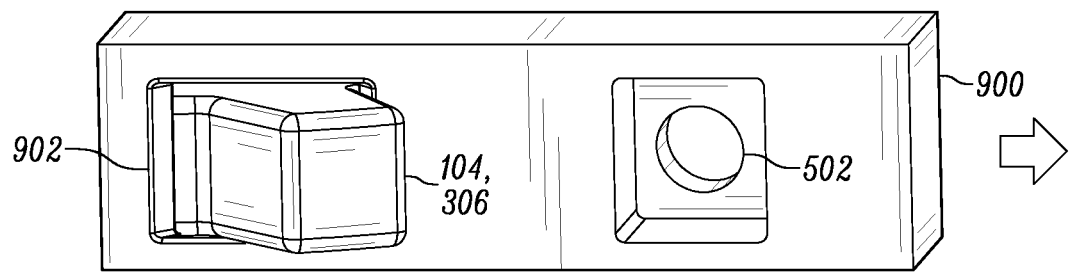
FIG. 9B an isometric drawing of one embodiment the energized parts guard illustrating a sliding door cover exposing the terminal aperture and interlocking with the open circuit breaker in accordance with the present disclosure.

In a further embodiment, illustrated in FIGS. 9A and 9B, the door insulated terminal covers 900 may interlock with the insulated controls 306 of the circuit breakers 104. The interlock prevents opening of the door cover unless the insulated control of the circuit breaker 104 is in the open position. For example, a sliding door cover may include an additional slot 902 which fits over the control lever of the circuit breaker, preventing the door cover from sliding open when the circuit breaker 104 is closed because it physically interferes with the lever of the circuit breaker. A similar interlock may be used on hinged door insulated terminal covers.

Figure 10:
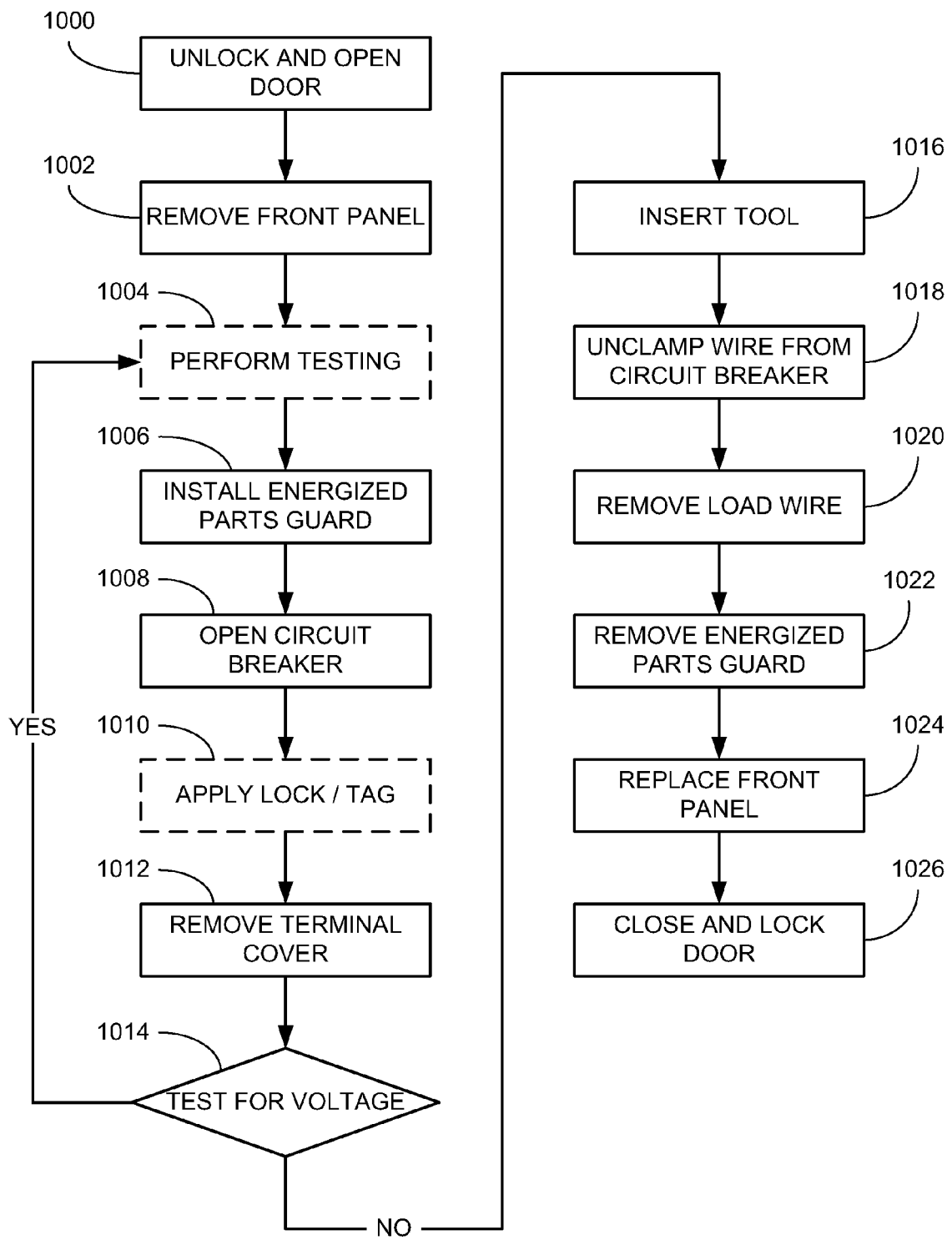
FIG. 10 is a flow chart of one exemplary method of using the energized parts guard in accordance with the present disclosure.

FIG. 10 illustrates an exemplary method for using the energized parts guard to remove an outgoing circuit from an electrical panel. At 1000, the door is unlocked and opened. At 1002 the front panel is removed. At 1004, any diagnostic testing or troubleshooting is performed on the exposed energized conductors, if needed. At 1006, the energized parts guard is installed over the circuit breaker controls. At 1008, the circuit breaker for the outgoing circuit to be removed is opened, de-energizing the circuit. At 1010, a lock and/or tag is applied to the opened circuit breaker, if required by safety rules. At 1012, the insulating cover over the terminal of the opened circuit breaker is removed, exposing the terminal aperture. At 1014, the exposed terminal is tested to confirm the circuit it de-energized. If not, additional troubleshooting may be required. At 1016, an appropriate tool, such as a screwdriver, is inserted through the terminal aperture. At 1018, the wire for the outgoing circuit is disconnected from the circuit breaker using the tool. At 1020, the wire is removed from the circuit breaker. If appropriate, the wire may be pulled back though conduit to its origin, or it may be temporarily capped with a wire nut, or it may be connected to the neutral bus for safety. At 1022, the energized parts guard is removed. At 1024, the front panel is replaced. At 1026, the door is closed and locked.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An energized part guard assembly for an existing enclosure which has one or more power circuit breakers, comprising:
   an insulating guard, said insulating guard comprising a sheet of substantially rigid, electrically insulative material wherein the substantially rigid sheet further comprises a first one or more apertures and a second one or more apertures;
      wherein the first one or more apertures are so dimensioned to receive one or more circuit breakers of the existing enclosure when the insulating guard is installed on the existing enclosure,
      wherein the first one or more apertures are further dimensioned such that there is less than a 12.5 millimeter gap between the sheet and the existing one or more circuit breakers on at least two sides of the existing one or more circuit breakers; and
      wherein the second one or more apertures are positioned to facilitate access to at least one terminal of the existing one or more circuit breakers of the existing enclosure when of the existing one or more circuit breakers of the existing enclosure are received by the first one or more apertures when the insulating guard is installed on the existing enclosure, and to prevent accidental contact with any exposed electrical part within the existing enclosure.

2. The energized part guard assembly of claim 1 further comprising a third one or more apertures configured to facilitate mounting the insulating guard to the existing enclosure when the existing one or more circuit breakers are received by the first one or more apertures.

3. The energized part guard assembly of claim 1 wherein the first one or more apertures are further configured such that there is less than a 12.5 millimeter gap between the sheet and of the existing one or more circuit breakers on at least three sides of the existing one or more circuit breakers.

4. The energized part guard assembly of claim 3 wherein the first one or more apertures are further configured such that there is less than a 12.5 millimeter gap between the sheet and the existing one or more circuit breakers on at least four sides of the existing one or more circuit breakers.

5. The energized part guard assembly of claim 1 wherein there is less than a 2.5 millimeter gap between the sheet and the existing one or more circuit breakers on at least two sides of the existing one or more circuit breakers.

6. The energized part guard assembly of claim 5 wherein there is less than a 2.5 millimeter gap between the sheet and the existing one or more circuit breakers on at least three sides of the existing one or more circuit breakers.

7. The energized part guard assembly of claim 6 wherein there is less than a 2.5 millimeter gap between the sheet and the existing one or more circuit breakers on at least four sides of the existing one or more circuit breakers.

8. The energized part guard assembly of claim 1 wherein there is less than a 1 millimeter gap between the sheet and the existing one or more circuit breakers on at least two sides of the existing one or more circuit breakers.

9. The energized part guard assembly of claim 8 wherein there is less than a 1 millimeter gap between the sheet and the existing one or more circuit breakers on at least three sides of the existing one or more circuit breakers.

10. The energized part guard assembly of claim 9 wherein there is less than a 1 millimeter gap between the sheet and the existing one or more circuit breakers on at least four sides of the existing one or more circuit breakers.

11. The energized part guard assembly of claim 1 wherein the sheet of substantially rigid, electrically insulative material extends at least 50 millimeter beyond any exposed edge of any of the existing one or more circuit breakers received by the first one or more apertures.

12. The energized part guard assembly of claim 1 wherein the sheet of substantially rigid, electrically insulative material extends at least 50 millimeter from any terminal of the existing one or more circuit breakers received by the first one or more apertures.

13. The energized part guard assembly of claim 1 wherein the sheet of substantially rigid, electrically insulative material further comprises a plurality of edges dimensioned that each is no greater than 50 millimeter from the existing enclosure housing the existing one or more circuit breakers when the existing one or more circuit breakers are received by the first one or more apertures.

14. The energized part guard assembly of claim 1 wherein the sheet of substantially rigid, electrically insulative material further comprises a plurality of edges which are configured to prevent contact with:
   any terminals of any of the existing one or more circuit breakers received by the first one or more apertures, except through the second one or more apertures;
   any electrical bus connected to any of the existing one or more circuit breakers received by the first one or more apertures;
   any exposed electrical conductors connected to the existing one or more circuit breakers received by the first one or more apertures or connected to the electrical bus connected to any of the existing one or more circuit breakers received by the first one or more apertures.

15. The energized part guard assembly of claim 1 further comprising one or more electrically insulating covers for the second one or more apertures.

16. The energized part guard assembly of claim 15 wherein the one or more insulating covers are tethered to the insulating guard.

17. The energized part guard assembly of claim 15 wherein the one or more electrically insulating covers comprise a plurality of electrically insulating covers which are tethered to one another by one or more tethers.

18. The energized part guard assembly of claim 17 wherein the one or more tethers between the electrically insulating covers of the plurality of electrically insulating covers are contiguous with the electrically insulating covers they tether.

19. The energized part guard assembly of claim 15 wherein one or more the insulating covers interlock with the existing one or more circuit breakers received by the first one or more apertures, preventing access to the terminals of the existing one or more circuit breakers unless the existing one or more circuit breakers are in the open position.

20. The energized part guard assembly of claim 1 wherein the energized part guard assembly is so dimensioned to permit attaching a lock or tag to an insulated control of at least one of the existing one or more circuit breakers when the existing one or more circuit breakers are received by the first one or more apertures.

\* \* \* \* \*